US007840657B2

(12) United States Patent
Moore et al.

(10) Patent No.: US 7,840,657 B2
(45) Date of Patent: Nov. 23, 2010

(54) METHOD AND APPARATUS FOR POWER-MANAGING STORAGE DEVICES IN A STORAGE POOL

(75) Inventors: William H. Moore, Fremont, CA (US); Darrin P. Johnson, Mountain View, CA (US); Tabriz I. Holtz, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 295 days.

(21) Appl. No.: 11/591,234

(22) Filed: Oct. 31, 2006

(65) Prior Publication Data

US 2008/0104204 A1 May 1, 2008

(51) Int. Cl.
*G06F 15/177* (2006.01)
(52) U.S. Cl. .................................. 709/222; 707/10
(58) Field of Classification Search ................ 709/222, 709/219, 224; 707/10; 711/148, 170
See application file for complete search history.

(56) References Cited

U.S. PATENT DOCUMENTS

| | | | |
|---|---|---|---|
| 4,144,522 A | 3/1979 | Kageyama et al. | |
| 5,129,085 A | 7/1992 | Yamasaki et al. | |
| 5,155,847 A | 10/1992 | Kirouac et al. | |
| 5,371,885 A | 12/1994 | Letwin | |
| 5,403,639 A | 4/1995 | Belsan et al. | |
| 5,410,667 A | 4/1995 | Belsan et al. | |
| 5,675,802 A | 10/1997 | Allen et al. | |
| 5,819,292 A | 10/1998 | Hitz et al. | |
| 6,209,111 B1 | 3/2001 | Kadyk et al. | |
| 6,341,341 B1 | 1/2002 | Grummon et al. | |
| 6,745,284 B1 | 6/2004 | Lee et al. | |
| 6,745,305 B2 | 6/2004 | McDowell | |
| 6,795,966 B1 | 9/2004 | Lim et al. | |
| 6,829,617 B2 | 12/2004 | Sawdon et al. | |
| 6,857,001 B2 | 2/2005 | Hitz et al. | |
| 6,892,211 B2 | 5/2005 | Hitz et al. | |
| 6,993,571 B2 * | 1/2006 | Kistler | 709/218 |
| 7,007,196 B2 | 2/2006 | Lee et al. | |
| 7,032,154 B2 | 4/2006 | Kidorf et al. | |
| 7,043,677 B1 | 5/2006 | Li | |
| 7,133,964 B2 | 11/2006 | Rodrigues et al. | |
| 7,162,486 B2 | 1/2007 | Patel et al. | |
| 7,174,352 B2 | 2/2007 | Kleiman et al. | |
| 7,200,715 B2 | 4/2007 | Kleiman et al. | |
| 7,434,090 B2 * | 10/2008 | Hartung et al. | 714/6 |

(Continued)

OTHER PUBLICATIONS

Sandberg, R. et al.; "Design and Implementation of the Sun Network Filesystem"; Sun Microsystems, Inc., 1985 USENIX Conference (12 pages).

(Continued)

*Primary Examiner*—William C Vaughn, Jr.
*Assistant Examiner*—Thomas Richardson
(74) *Attorney, Agent, or Firm*—Osha • Liang LLP

(57) ABSTRACT

A method for power-managing storage devices in a storage pool involves monitoring the storage pool to determine whether a storage management policy is satisfied, where the storage pool comprises a first storage device that is powered up and a second storage device that is powered down, powering up the second storage device after the storage management policy is satisfied, and making the second storage device available for use in the storage pool after the second storage device is powered up.

20 Claims, 8 Drawing Sheets

U.S. PATENT DOCUMENTS

| | | | |
|---|---|---|---|
| 7,434,097 B2* | 10/2008 | Guha et al. | 714/7 |
| 7,499,986 B2* | 3/2009 | Axberg et al. | 709/221 |
| 2002/0004883 A1 | 1/2002 | Nguyen et al. | |
| 2002/0055942 A1 | 5/2002 | Reynolds | |
| 2002/0087788 A1 | 7/2002 | Morris | |
| 2002/0161972 A1 | 10/2002 | Talagala et al. | |
| 2003/0033477 A1 | 2/2003 | Johnson et al. | |
| 2003/0126107 A1 | 7/2003 | Yamagami | |
| 2003/0145167 A1 | 7/2003 | Tomita | |
| 2004/0098720 A1 | 5/2004 | Hooper | |
| 2004/0107314 A1 | 6/2004 | Kim et al. | |
| 2004/0123063 A1 | 6/2004 | Dalal et al. | |
| 2004/0153481 A1* | 8/2004 | Talluri | 707/200 |
| 2004/0225834 A1 | 11/2004 | Lu et al. | |
| 2004/0234000 A1 | 11/2004 | Page | |
| 2005/0010620 A1 | 1/2005 | Silvers et al. | |
| 2005/0097270 A1 | 5/2005 | Kleiman et al. | |
| 2005/0235154 A1 | 10/2005 | Serret-Avila | |
| 2006/0168409 A1 | 7/2006 | Kahn et al. | |
| 2006/0218644 A1 | 9/2006 | Niles et al. | |
| 2006/0256965 A1 | 11/2006 | Rowe | |
| 2008/0030945 A1* | 2/2008 | Mojaver et al. | 361/685 |

OTHER PUBLICATIONS

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"Veritas File System 3.4 Administrator's Guide" Veritas Software Corporation, Nov. 2000, http://www.veritas.com; pp. 1-227 (227 pages).

Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).

Osorio, N. et al.; "Guidelines for Using Snapshot Storage Systems for Oracle Databases"; Oracle Corporation, Oct. 2001 (13 pages).

Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).

Sun StorEdge Instant Image 2.0 System Administrator's Guide; Sun Microsystems, Inc., February 2000, Revision A (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The LOCUS Distributed System Architecture"; The MIT Press, Cambridge, Massachusetts, 1985 The Massachusetts Institute of Technology (8 pages).

Gray, J. et al.; "The Recovery Manager of the System R Database Manager"; Computing Surveys, vol. 13, No. 2, Jun. 1981 (20 pages).

Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am May 23, 1991 an der TU Berlin, and English Translation (245 pages).

Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).

"The Enterprise Challenge Served by Snapshot"; Whitepaper, 2001 LSI Logic Corporation (8 pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistent Snapshots"; Department of Computer Science and Automation, Indian Institute of Science, Bangalore—560 012, Jan. 2000 (38 pages).

"Proceedings of the 5th Annual Linux Showcase & Conference" USENIX Association, Oakland, California, Nov. 5-10, 2001 (11 pages).

Borg, A. et al.; "Fault Tolerance Under UNIX"; ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, Univeristy of California, 1991 (15 pages).

Hecht, M. S. et al.; "Shadowed Management of Free Disk Pages with a Linked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

Johnson, J. E. et al.; "Overview of the Spiralog File System", Digital Technical Journal, vol. 8, No. 2, 1996, pp. 5-14 (10 pages).

Santry, D. S. et al.; "Deciding When to Forget in the Elephant File System"; 17th ACM Symposium on Operating Systems Principles (SOSP '99), Dec. 1999; pp. 110-123 (14 pages).

Chutani, S. et al., "The Episode File System"; Proceedings of the 1992 USENIX Winter Technical Conference; 1992; (18 pages).

Seltzer, M.L.; "File System Performance and Transaction Support"; University of California at Berkeley, 1992 (131 pages).

Austin, B. "A Dynamic Disc Allocation Algorithm Designed to Reduce Fragmentation During Filing Reloading", Information Sciences Laboratory, Corporate Research and Development Center, General Electric Company, 4 pages, 1970.

Goodheart, B., Cox, J. "The Magic Garden Explained", Prentice Hall, 8 pages, 1994.

Stallings, W. "Computer Organization and Architecture: Designing for Performance", Prentice Hall, 4 pages, 2000.

Goodheart, B., Cox, J., "The Magic Garden Explained", Prentice Hall, pp. 24-25, 29-30, 390-391, 1994.

Austin, B.J. "A Dynamic Disc Allocation Algorithm Designed to Reduce Fragmentation during File Reloading", pp. 378-381, 1970.

Stallings, W., "Computer Organization and Architecture: Designing for Performance", Prentice Hall, pp. 377-378, 2000.

* cited by examiner

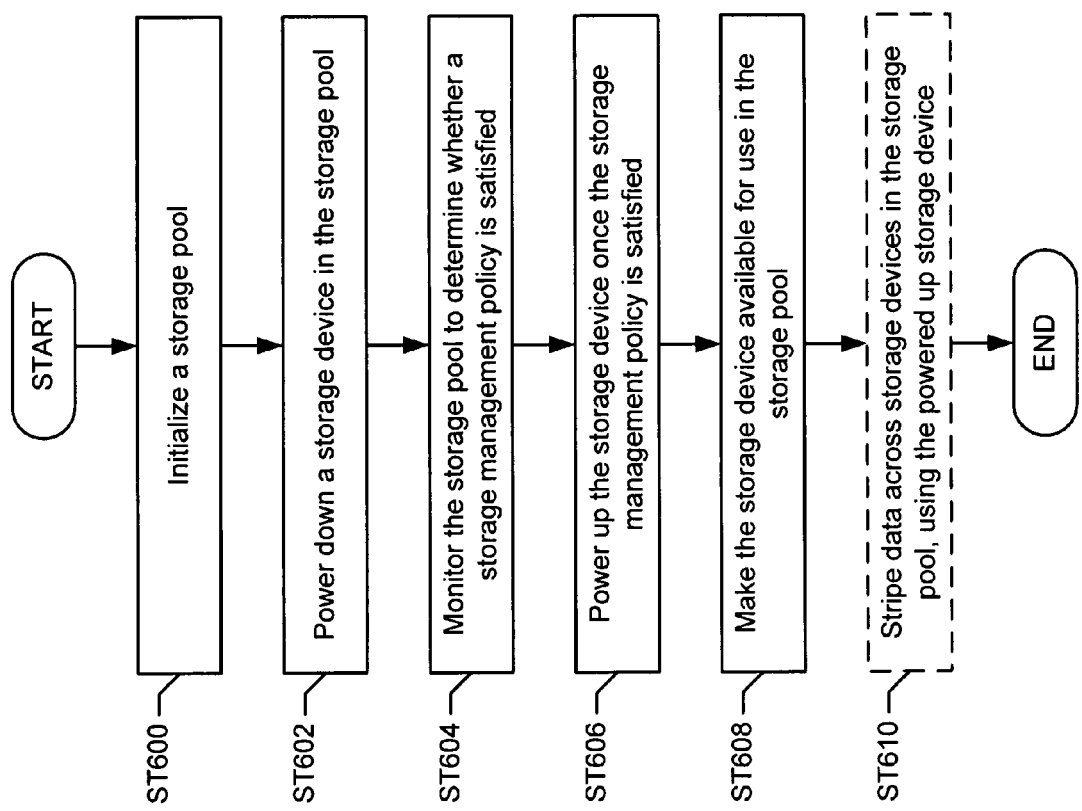

METHOD AND APPARATUS FOR POWER-MANAGING STORAGE DEVICES IN A STORAGE POOL

CROSS-REFERENCE TO RELATED APPLICATIONS

The present application contains subject matter that may be related to the subject matter in the following U.S. patent applications, which are all assigned to a common assignee: "Method and Apparatus for Self-Validating Checksums in a File System" (application Ser. No. 10/828,573) filed on Apr. 24, 2004; "Method and Apparatus for Dynamic Striping" (application Ser. No. 10/828,677) filed on Apr. 21, 2004; "Method and Apparatus for Vectored Block-Level Checksum for File System Data Integrity" (application Ser. No. 10/828, 715) filed on Apr. 21, 2004; "Method and Apparatus for Identifying Tampering of Data in a File System" (application Ser. No. 10/853,874) filed on May 26, 2004; "Method and System for Detecting and Correcting Data Errors Using Checksums and Replication" (application Ser. No. 10/853, 837) filed on May 26, 2004; "Method and System for Detecting and Correcting Data Errors Using Data Permutations" (application Ser. No. 10/853,870) filed on May 26, 2004; "Method and Apparatus for Compressing Data in a File System" (application Ser. No. 10/853,868) filed on May 26, 2004; "Automatic Conversion of All-Zero Data Storage Blocks into File Holes" (application Ser. No. 10/853,915) filed on May 26, 2004; "Gang Blocks" (application Ser. No. 10/919,878) filed on Aug. 17, 2004; "Method and Apparatus for Enabling Adaptive Endianness" (application Ser. No. 10/919,886) filed on Aug. 17, 2004; "Method and System for Data Replication" (application Ser. No. 11/434,296) filed on May 15, 2006; "Multiple Replication Levels with Pooled Devices" (application Ser. No. 11/406,956) filed on Apr. 19, 2006; "Method and System for Per-File and Per-Block Replication" (application Ser. No. 11/406,850) filed on Apr. 19, 2006; "Method and System for Dirty Time Logging" (application Ser. No. 11/407,773) filed on Apr. 19, 2006; "Method and System for Dirty Time Log Directed Resilvering" (application Ser. No. 11/407,744) filed on Apr. 19, 2006; "Method and System for Metadata-Based Resilvering" (application Ser. No. 11/407,719) filed on Apr. 19, 2006; "Method and System for Pruned Resilvering Using a Dirty Time Log" (application Ser. No. 11/409,427) filed on Apr. 19, 2006; "Method and System Using Checksums to Repair Data" (application Ser. No. 11/406,756) filed on Apr. 19, 2006; "Method and System for Repairing Partially Damaged Blocks" (application Ser. No. 11/406,578) filed on Apr. 19, 2006; "Method and System for Storing a Sparse File Using Fill Counts" (application Ser. No. 11/406,592) filed on Apr. 19, 2006; "Method and System for Object Allocation Using Fill Counts" (application Ser. No. 11/408,134) filed on Apr. 20, 2006; "Ditto Blocks" (application Ser. No. 11/406,590) filed on Apr. 19, 2006; "Method and System for Adaptive Metadata Replication" (application Ser. No. 11/406,957) filed on Apr. 19, 2006; "Method and System for Block Reallocation" (application Ser. No. 11/409,435) filed on Apr. 19, 2006; "Method and System for Using a Block Allocation Policy" (application Ser. No. 11/407,637) filed on Apr. 20, 2006; "Block-Based Incremental Backup" (application Ser. No. 11/432,067) filed on May 11, 2006; "Unlimited File System Snapshots and Clones" (application Ser. No. 11/513, 800) filed on Aug. 31, 2006; "Reflecting Bandwidth and Priority in Network Attached Storage I/O" (application Ser. No. 11/489,936) filed on Jul. 20, 2006; "Method and System for Reallocating Blocks in a Storage Pool" filed on Oct. 31, 2006; and "Method and System for Priority-Based Allocation in a Storage Pool" filed on Oct. 31, 2006.

BACKGROUND

A typical operating system includes a file system. The file system provides a mechanism for the storage and retrieval of files and a hierarchical directory structure for the naming of multiple files. More specifically, the file system stores information provided by a user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk.

To access a file, the operating system (via the file system) typically provides file manipulation interfaces to open, close, read, and write the data within each file. More specifically, the file system stores data on the storage device by managing the allocation of space within the storage device. Typically, the volume manager provides space which is managed by the file system. Two common types of file system space allocation strategies are known as block-based allocation and extent-based allocation. Block-based allocation creates incremental disk space for each file each time the file is extended (i.e., modified via a write request to add information), whereas extent-based allocation creates a large series of contiguous blocks (i.e., extents) each time the file exhausts the space available in the file's last extent.

When allocating space, both block-based and extent-based allocation use space provided by the volume manager. The volume manager allows multiple physical disks to be used as a single volume (i.e., a virtual disk) to provide larger consolidated storage sizes and simpler management. The volume manager allows users to organize data along volume boundaries (i.e., each volume has physical disk space allocated to the volume such that the volume is tied only to that dedicated physical disk). The volume manager is typically implemented as a separate layer between the physical disks and the file system, and is presented to the user as a virtual disk device. In other words, volume managers organize the collections of physical devices (e.g., disks) into virtual devices. Additionally, the space allocated within the volume manager is handled by the file system. Consequently, the volume manager is not aware of which blocks within the available storage space are in use and which blocks are free for data to be stored.

Further, file systems may be mounted on the virtual disk devices. Thus, physical disks are partitioned and allocated to multiple virtual disk devices, and each virtual disk device is capable of having a file system that exclusively uses that particular virtual disk device. A request to access a file is typically performed by an application, via the file system, using a file name and logical offset. This file name and logical offset (i.e., the manner in which applications express file operation requests) corresponds to a location within the virtual disk device. Subsequently, the request is translated to physical disk space on the storage device by the volume manager, allowing the user of the application to access the data within a particular file.

Typically, to add a disk to a volume, all data stored on the volume is backed up to an alternate location (i.e., another volume or any other alternate storage device outside of the volume). The volume is then destroyed and subsequently recreated with the new disk. Finally, the backed up data is transferred back onto the recreated volume. To avoid the need to recreate a volume when a disk is added to the volume, volumes are frequently over-provisioned. That is, a volume may be created using more disks than are initially needed. Thus, the disks are always available for use in the volume, whether or not the storage capacity of the disks is actually needed.

SUMMARY

In general, in one aspect, the invention relates to a method for power-managing storage devices in a storage pool. The method comprises monitoring the storage pool to determine whether a storage management policy is satisfied, wherein the storage pool comprises a first storage device that is powered up and a second storage device that is powered down, powering up the second storage device after the storage management policy is satisfied, and making the second storage device available for use in the storage pool after the second storage device is powered up.

In general, in one aspect, the invention relates to a system. The system comprises a storage pool comprising a first storage device that is powered up, and a second storage device that is powered down, and a storage device management mechanism configured to monitor the storage pool to determine whether a storage management policy is satisfied, power up the second storage device after the storage management policy is satisfied, and make the second storage device available for use in the storage pool after the second storage device is powered up.

In general, in one aspect, the invention relates to a computer readable medium. The computer readable medium comprises executable instructions for power-managing storage devices in a storage pool by monitoring the storage pool to determine whether a storage management policy is satisfied, wherein the storage pool comprises a first storage device that is powered up and a second storage device that is powered down, powering up the second storage device after the storage management policy is satisfied, and making the second storage device available for use in the storage pool after the second storage device is powered up.

Other aspects of the invention will be apparent from the following description and the appended claims.

BRIEF DESCRIPTION OF DRAWINGS

FIGS. 5-6 show flow charts in accordance with one embodiment of the invention.

DETAILED DESCRIPTION

Figure 1:
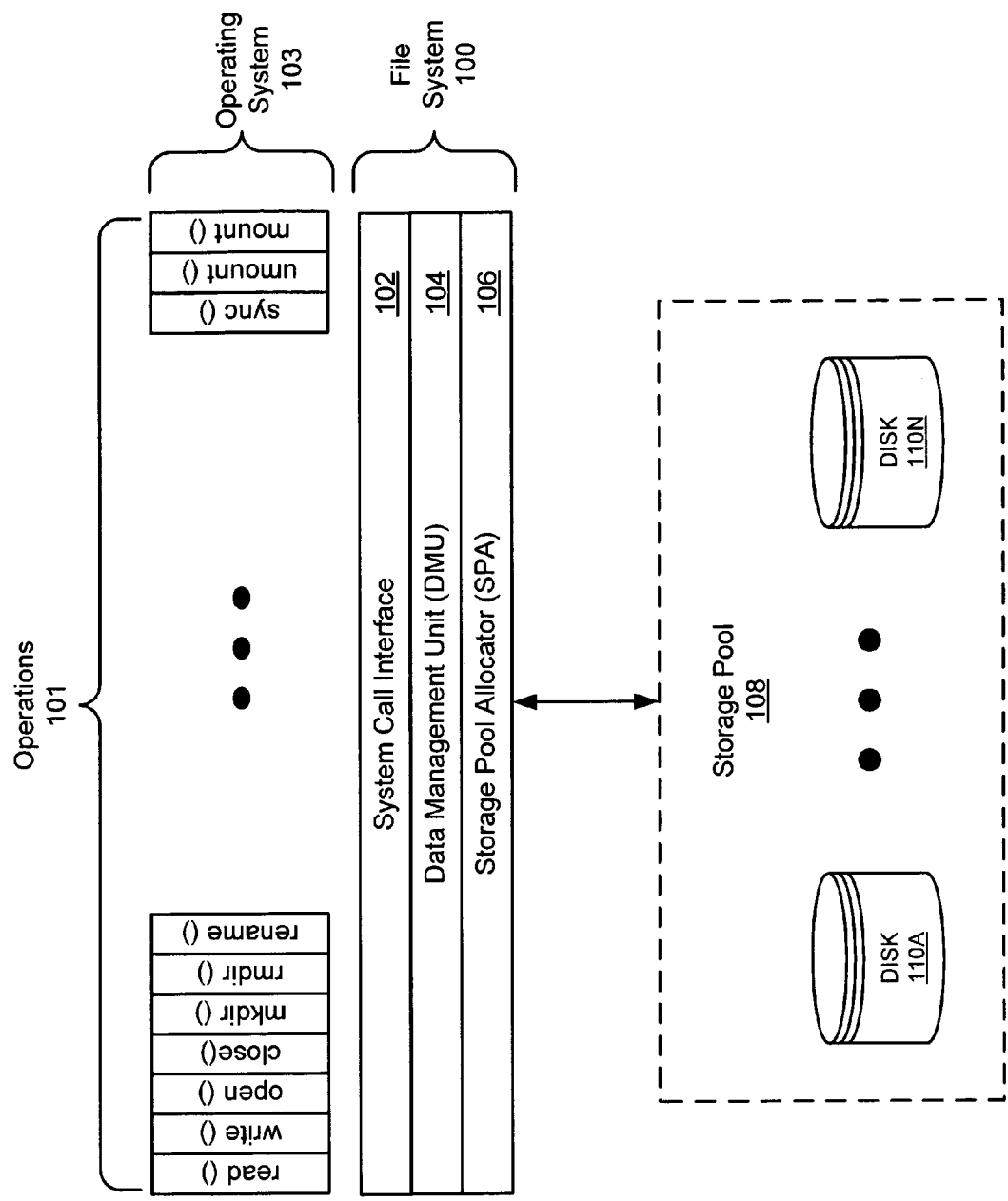
FIG. 1 shows a diagram of a system architecture in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for power-managing storage devices in a storage pool. Specifically, in one or more embodiments of the invention, a storage pool is monitored to determine whether a storage management policy is satisfied. Further, in one or more embodiments of the invention, after the storage management policy is satisfied, a storage device is powered up and made available for use in the storage pool.

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into I/O requests allowing related blocks to be forwarded to the SPA (106) together. The SPA (106) receives transactions from the DMU (106) and subsequently writes the blocks into the storage pool (108). The operation of the SPA (106) is described in FIG. 2 below.

In one embodiment of the invention, the storage pool (108) includes one or more physical disks (disks (110A-110N)).

Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
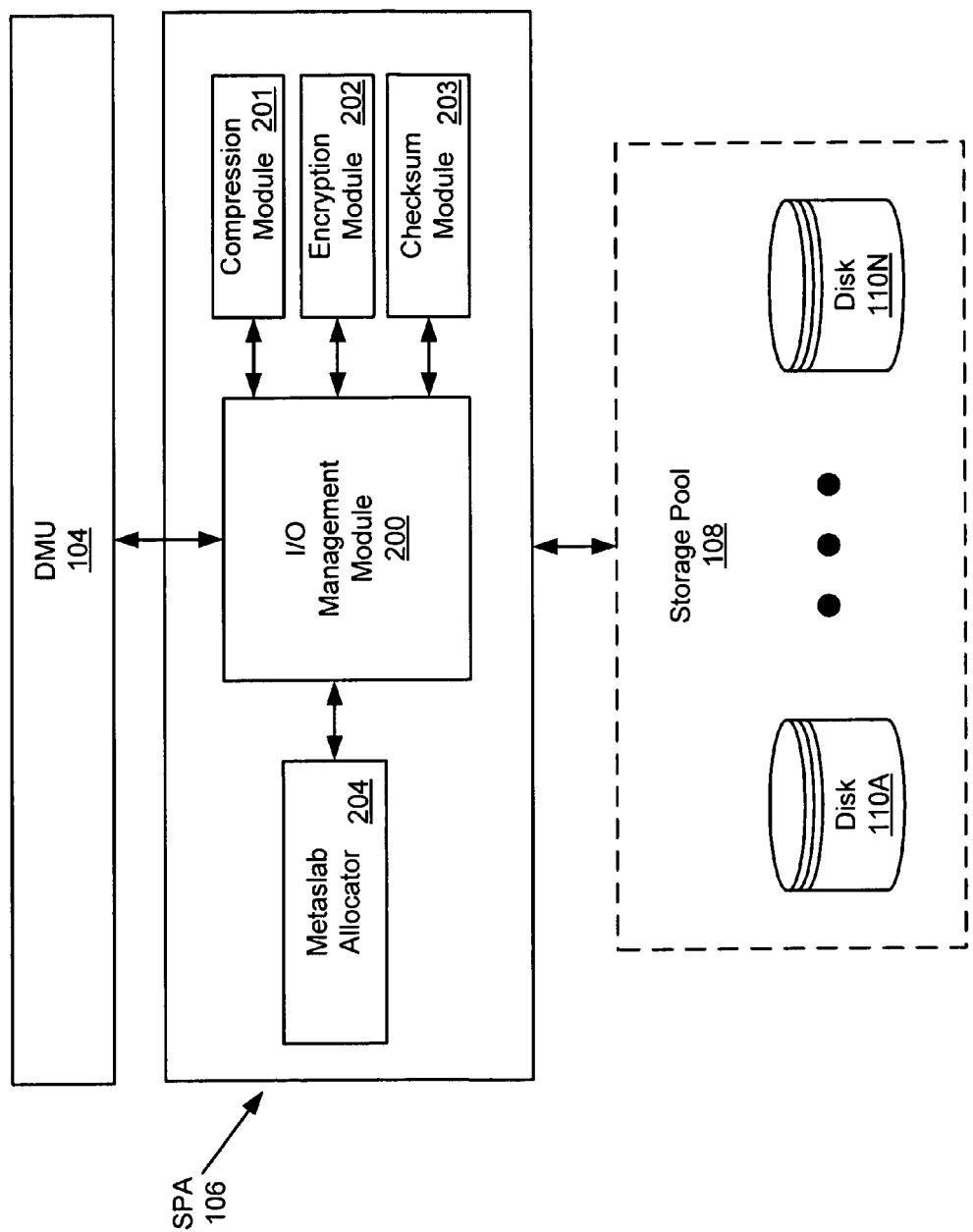
FIG. 2 shows a diagram of a storage pool allocator in accordance with one embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these aforementioned modules in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8K bytes may be compressed to a size of 2K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator may include a policy that specifies a method to allocate segments.

Figure 3:
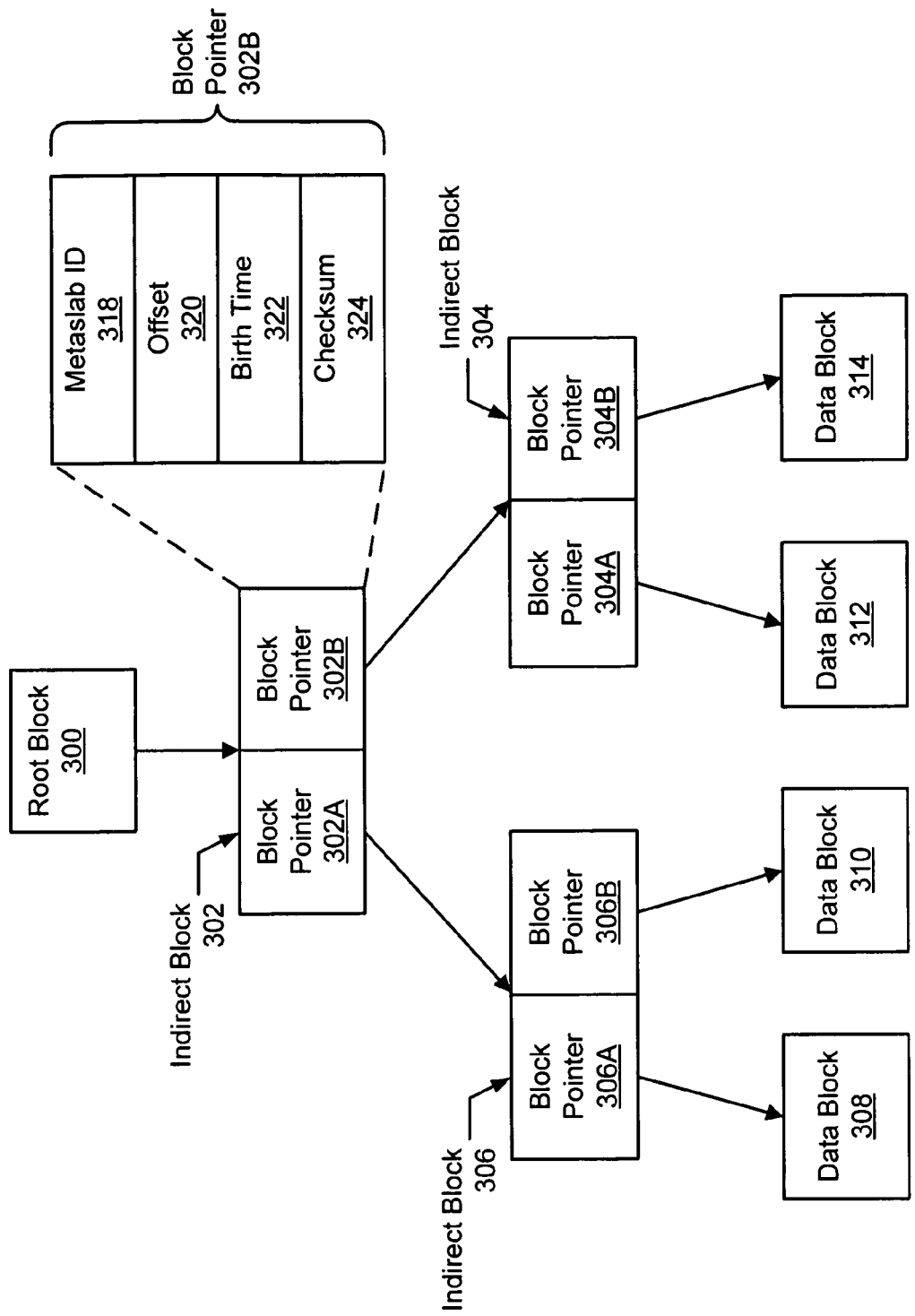
FIG. 3 shows a diagram of a hierarchical data configuration in accordance with one embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306).

In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather, data blocks contain actual data of files within the file system.

In one embodiment of the invention, each block pointer includes a metaslab ID (318), an offset (320) within the metaslab, a birth value (322) of the block referenced by the block pointer, and a checksum (324) of the data stored in the block (data block or indirect block) referenced by the block pointer. In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Figure 4:
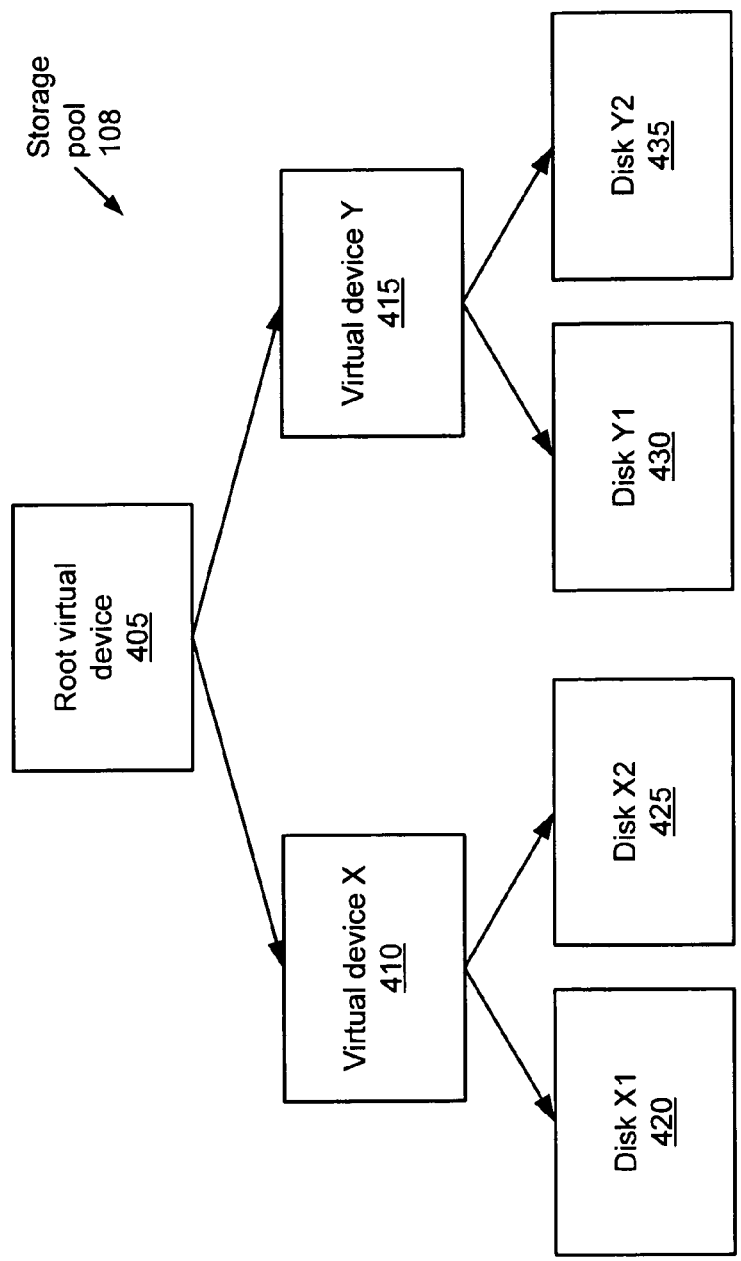
FIG. 4 shows a diagram of a storage pool in accordance with one embodiment of the invention.

FIG. 4 shows a diagram of a storage pool (108) in accordance with one embodiment of the invention. As noted above, a storage pool includes one or more physical disks (e.g., disk X1 (420), disk X2 (425), disk Y1 (430), disk Y2 (435)). Further, disks in the storage pool may be grouped into virtual devices. Specifically, virtual devices provide a logical layer of abstraction over underlying physical disks. A process accessing a virtual device typically views the virtual device as a single storage device. That is, the process is not aware of the underlying arrangement of physical disks.

For example, in FIG. 4, disk X1 (420) and disk X2 (425) are grouped into virtual device X (410). Similarly, disk Y1 (430) and disk Y2 (435) are grouped into virtual device Y (415). While FIG. 4 shows two virtual devices (410, 415) each having two underlying physical disks (420, 425 and 430, 435), any other arrangement of virtual devices and/or physical disks may be used. For example, the storage system (108) may include only a single virtual device. Further, a virtual device may have only one underlying physical disk. In one embodiment of the invention, the physical disk(s) themselves are also treated as a class of virtual devices within the file system.

In one embodiment of the invention, virtual devices are configured in a virtual device tree. Accordingly, the storage pool (108) may include a root virtual device (405) acting as a root of the virtual device tree. While the root virtual device (405) illustrated in FIG. 4 has only two immediate children (i.e., virtual device X (410) and virtual device Y (415)), the root virtual device (405) may have any other number of children, as permitted by the file system. Further, the virtual device tree may include any number of levels of virtual devices, and the tree may not be balanced. That is, one branch of the tree may have more levels than another branch, and/or may include more virtual devices than another branch.

Figure 5:
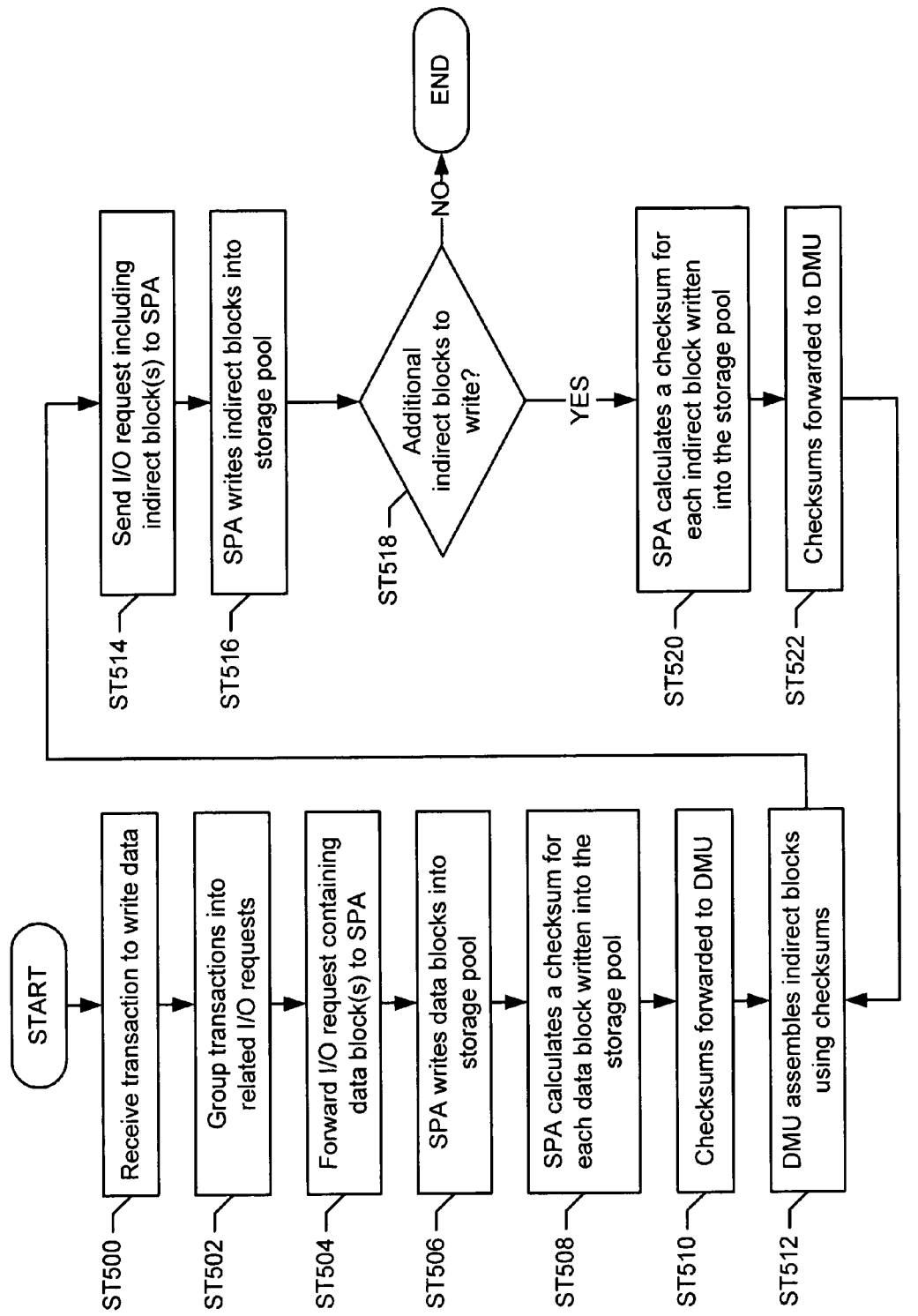

Using the infrastructure described above in relation to FIGS. 1-4, the following discussion describes a method for writing data to a storage pool in accordance with one embodiment of the invention. FIG. 5 shows a flow chart in accordance with one embodiment of the invention. In one embodiment of the invention, one or more of the steps discussed below may be omitted, repeated, and/or performed in a different order than the order shown in FIG. 5. Accordingly, the specific arrangement of steps shown in FIG. 5 should not be construed as limiting the scope of the invention.

Initially, the DMU receives a transaction from an application, the operating system (or a subsystem therein), etc. (ST 500). The DMU subsequently groups the transaction into one or more I/O requests (ST 502). The I/O requests are subsequently forwarded to the SPA (ST 504).

In one embodiment of the invention, the transaction includes one or more data blocks, and/or one or more indirect blocks. As noted above, the file system is stored on disk using a hierarchical structure including data blocks and indirect blocks. Thus, for a given set of transactions, the first I/O request includes the data blocks to be written to disk, while subsequent I/O requests include the corresponding indirect blocks containing one or more block pointers. Accordingly, I/O request referenced in ST 504 includes data blocks.

Continuing with the discussion of FIG. 5, the SPA, upon receiving the I/O request including data blocks from the DMU, writes the data blocks into the storage pool (ST 506). The SPA subsequently calculates a checksum for each data block written into the storage pool (ST 508). In one embodiment, the checksum module (203 in FIG. 2) within the SPA is used to calculate the checksum for each data block written into the storage pool. The checksums are subsequently forwarded to the DMU (ST 510). The DMU then assembles the indirect blocks using the checksums (ST 512). Specifically, the DMU places the checksum for a given data block in the appropriate block pointer within the indirect block (i.e., the parent indirect block of the data block). Next, the indirect blocks are forwarded to the SPA (ST 514). Those skilled in the art will appreciate that the aforementioned indirect blocks correspond to the indirect blocks that directly point (via the block pointers) to the data blocks (as opposed to indirect blocks that point to other indirect blocks).

Next, the SPA receives and subsequently writes the indirect blocks into the storage pool (ST 516). A determination is then made about whether additional indirect blocks exist to write into the storage pool (i.e., whether the last indirect block written to the storage pool corresponds to the root block) (ST 518). If no additional indirect blocks exist, then the method is complete. However, if additional indirect blocks exist, then the SPA calculates the checksum from each of the indirect blocks written into the storage pool (ST 520). The checksums for each of the indirect blocks is subsequently forwarded to the DMU (ST 522). Steps ST 512 through ST 522 are subsequently repeated until the root block is written into the storage pool.

As blocks are written to a storage pool, available storage capacity in the storage pool typically decreases over time. Accordingly, it may be desirable to add another storage device to the storage pool. FIG. 6 shows a flow chart in accordance with one embodiment of the invention. Specifically, FIG. 6 shows a flow chart of a method for managing storage devices in a storage pool in accordance with one embodiment of the invention. In one embodiment of the invention, one or more of the steps discussed below may be omitted, repeated, and/or performed in a different order than the order shown in FIG. 6. Accordingly, the specific arrangement of steps shown in FIG. 6 should not be construed as limiting the scope of the invention.

In one embodiment of the invention, a storage pool is first initialized (ST 600). Specifically, initializing the storage pool may involve configuring the storage pool to recognize multiple specific storage devices. The storage devices may include solid state storage (e.g., flash memory, etc.), magnetic storage (e.g., hard disk, floppy disk, tape drive, magnetic core memory, thin film memory, drum memory, etc.), optical storage (e.g., compact disc, laser disc, magneto-optical drive, digital versatile disc (DVD), Blu-ray disc (BD), ultra density optical (UDO) disc, etc.), any other similar type of storage device, or any combination thereof. Accordingly, while embodiments of the invention are discussed herein with respect to a "disk," one skilled in the art will appreciate that any other of the aforementioned storage devices, or any combination thereof, may be used. Blu-ray disk (BD) is a registered trademark of the Blu-Ray Disc Association.

In one embodiment of the invention, no user data is written to the storage devices when the storage pool is initialized. That is, any data written to the storage devices during initialization may simply be configuration data describing the storage devices' role in the storage pool. For example, a virtual device label may be written to one or more designated locations on the storage devices.

In one embodiment of the invention, in its initial configuration, the storage pool may be over-provisioned. That is, the number and/or capacity of storage devices used to initialize the storage pool may be greater than what is needed to satisfy existing storage requirements. Alternatively, the storage pool may be initialized with only the number and/or capacity of storage device(s) needed to satisfy existing storage requirements.

In one embodiment of the invention, one or more storage devices are powered down (ST 602). For example, if the storage pool is over-provisioned, a storage device used to initialize the storage pool may be powered down. Those skilled in the art will appreciate that if the storage pool is initialized (i.e., in ST 600) with only the number and/or capacity of storage device(s) needed to satisfy existing storage requirements, then powering down storage devices may not be necessary. Specifically, one or more storage devices available to be added to the storage pool may already be powered down. In one embodiment of the invention, one or more storage devices are powered down in ST 602, and one or more other storage devices are already powered down. Said another way, any combination of storage devices that require powering down and storage devices that are already powered down may be used.

In one embodiment of the invention, powering down a storage device may involve removing all electrical current to the storage device completely. Alternatively, the storage device may simply be placed in a power-saving mode. For example, a hard disk may be "spun down," i.e., rotation of hard disk platters may be halted. In one embodiment of the invention, the storage device is powered down by issuing a command to a hardware and/or software interface controlling the storage device. For example, a command to power down a hard disk may be issued to a hard disk controller, using an interface provided by the hard disk controller.

Further, in one embodiment of the invention, the storage device that is powered down is a virtual device, as discussed above in relation to FIG. 4. That is, powering down the storage device may involve powering down one or more underlying physical devices. Accordingly, in the following discussion, references to a storage device may in fact refer to a virtual device and one or more underlying physical devices.

In one embodiment of the invention, powering down a storage device reduces power consumption associated with the storage pool. For example, one skilled in the art will appreciate that a spun down hard disk consumes less power than a spun up hard disk. Further, powered up storage devices typically generate more heat than powered down storage devices. Accordingly, powering down a storage device may reduce cooling requirements associated with the storage pool. More generally, powering down a storage device may reduce the cost of operating the storage pool, may reduce environmental impact of the storage pool, and/or may ease operating demands placed on a system administrator and/or infrastructure supporting the storage pool.

In one embodiment of the invention, storage requirements and/or available storage capacity associated with the storage pool change with time. Accordingly, the storage pool may be monitored to determine whether a storage management policy is satisfied (ST 604). Specifically, the storage management policy may define one or more conditions in which a storage device should be added to the storage pool. For example, the storage management policy may be based on an aggregate utilization level of one or more powered up storage devices in the storage pool. That is, the storage management policy may be satisfied when the aggregate utilization level of the storage device(s) reaches a threshold value (e.g., a predefined number of megabytes, a predefined percentage of total storage capacity, etc.). Alternatively, the storage management policy may be time-based, i.e., the storage management policy may define specific times and/or time intervals when a storage device should be added to the storage pool. One skilled in the art will appreciate that many other conditions exist in which adding a storage device to the storage pool may be desirable. Accordingly, the specific storage management policy types discussed herein should not be construed as limiting the scope of the invention.

In one embodiment of the invention, after the storage management policy is satisfied, a powered-down storage device is powered up (ST 606). For example, power may be restored to a storage device having no power at all, a storage device may be removed from a power-saving mode, a hard disk may be spun up, etc. The storage device is then made available for use in the storage pool (ST 608). That is, the storage device is made available to store data written to the storage pool. Specifically, if storage devices in the storage pool are arranged in a virtual device tree, as discussed above in relation to FIG. 4, making the storage device available for use in the storage pool may involve making a branch of the virtual device tree leading to the storage device accessible.

In one embodiment of the invention, multiple powered down storage devices exist to choose from. Accordingly, the storage device that is powered up may be chosen from the powered down storage devices based on a storage management policy. For example, the storage management policy may provide guidelines for powering up a storage device based on storage capacity, rotational platter speed, power requirements, purchase price, or any other similar factor.

In view of the above discussion, one skilled in the art will appreciate that after the storage device is made available for use in the storage pool, the storage device may be used for many different purposes. Specifically, in one embodiment of the invention, the storage pool is used for striping data across multiple storage devices. Accordingly, the powered-up storage device may be used for striping data (ST 610). Alternatively, the storage capacity of the powered-up storage device may simply be added to existing storage capacity in the storage pool, may be added to a mirror (e.g., a virtual device designated as a mirror), may be designated for specific types of data, or may be used for any other purpose, depending for example on an allocation policy associated with the storage pool. Detailed discussion of allocation policies can be found, for example, in copending U.S. patent application Ser. No. 11/591,425, entitled "Method and System for Priority-Based Allocation in a Storage Pool," filed on Oct. 31, 2006, in the names of the same inventors as the present application and assigned to a common assignee, the entire contents of which are incorporated herein by reference.

In one embodiment of the invention, one or more of the steps described above in relation to FIG. 6 may be managed by a file system (e.g., file system (100) of FIG. 1). For example, monitoring the storage pool, powering up the storage device, and making the storage device available for use in the storage pool may all be managed by the file system. More specifically, determination of whether the storage management policy is satisfied may be performed by a storage pool allocator (SPA) (e.g., SPA (106) of FIG. 1). Further, the SPA may be configured to issue the necessary command(s) to power up the storage device, and may subsequently make the storage device available for use in the storage pool.

Further, one or more of the steps described above in relation to FIG. 6 may be managed by an electronic storage management agent independent of the storage pool and file system. Specifically, the electronic storage management agent may be a hardware and/or software module configured to monitor the storage pool to determine whether the storage management policy is satisfied. Further, the electronic storage management agent may be configured to issue the necessary command(s) to power up the storage device, and may further be configured to issue the necessary command(s) to make the storage device available for use in the storage pool. For example, after the storage device is powered up, the electronic storage management agent may issue a command to the file system to make the storage device available in the storage pool. In one embodiment of the invention, responsibility for one or more of the steps described above in relation to FIG. 6 is shared between a file system and an electronic storage management agent.

FIGS. 7A-7F show diagrams of an example of managing storage devices in accordance with one embodiment of the invention. One skilled in the art will appreciate that FIG. 7A-7F are provided for exemplary purposes only, and accordingly, should not be construed as limiting the scope of the invention.

Figure 7A:
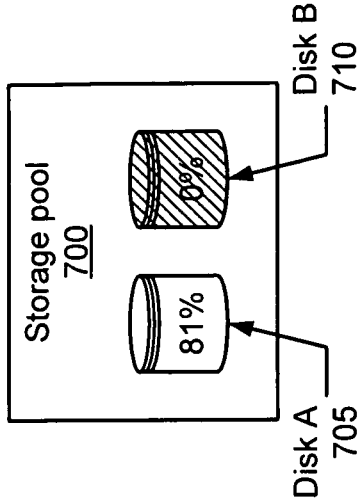
FIGS. 7A-7F show diagrams of an example of managing storage devices in accordance with one embodiment of the invention.
Figure 7B:
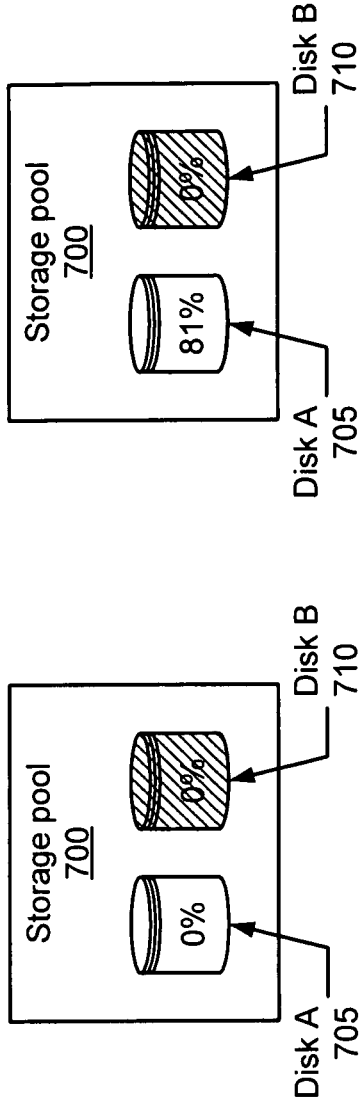

In FIG. 7A, a storage pool (700) is initialized using two disks (i.e., disk A (705) and disk B (710)). As shown in FIG. 7A, no user data has been written to the storage pool (700). Accordingly, the utilized storage capacity of disk A (705) and disk B (710) is zero percent. In FIG. 7B, disk B (710) is powered down. At this point, the storage pool (700) still does not contain any user data.

Figure 7C:
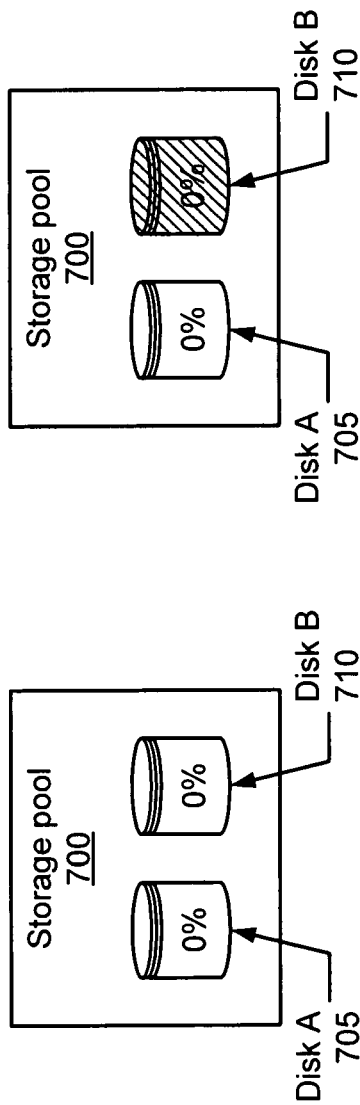
Figure 7D:
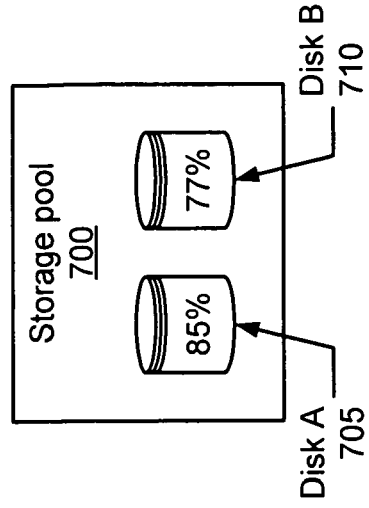

In FIG. 7C, user data is written to the storage pool (700). Specifically, because disk B (710) is powered down, the user data is written exclusively to disk A (705). Specifically, user data has been written to occupy eighty-one percent of the total storage capacity of disk A (705).

In this example, a storage management policy is used that places a storage pool utilization threshold at eighty percent of the aggregate storage capacity in the storage pool (700). In FIG. 7C, the storage management policy is satisfied, i.e., the storage utilization threshold has been reached. Accordingly, in FIG. 7D, disk B (710) is powered up and made available for use in the storage pool (700).

Figure 7E:
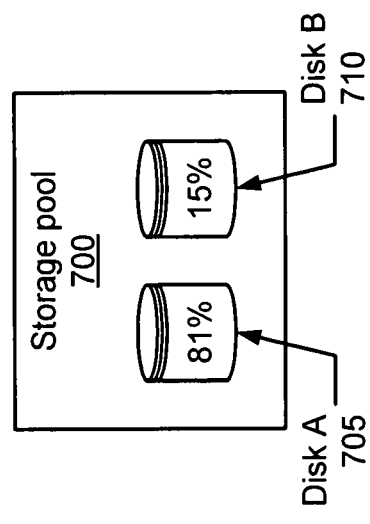

In FIG. 7E, when user data is written to the storage pool (700), both disk A (705) and disk B (710) are used. The specific allocation of blocks to the two disks may depend on an allocation policy associated with the storage pool. For example, the allocation policy may indicate that the user data is striped across disk A (705) and disk B (710) after disk B (710) is available for use in the storage pool (700). As discussed above, other allocation policies may be used.

Figure 7F:
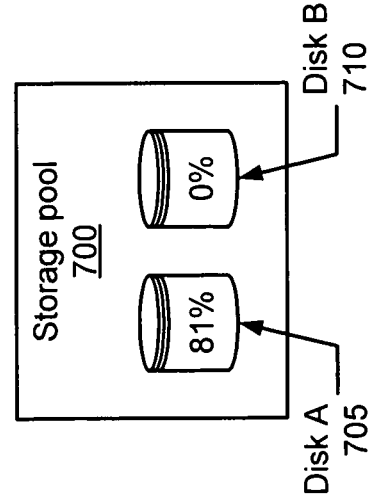

In FIG. 7F, additional user data has been written to the storage pool (700). Specifically, disk A (705) is now at eighty-five percent utilization, and disk B (710) is now at seventy-seven percent utilization. That is, the aggregate storage utilization in the storage pool (700) is after again eighty-one percent of the total storage capacity of the storage pool (700). If another disk (not shown) associated with the storage pool (700) is powered down, the disk may also be powered up and made available for use in the storage pool (700).

In one embodiment of the invention, storage devices may also be removed from a storage pool. Specifically, storage devices may also be powered down based on a storage management policy. For example, storage devices may be powered down to avoid overheating, to reduce the amount of unutilized storage space, to save money, or for any other similar reason. Detailed discussion of a method for removing a storage device from a storage pool can be found in copending U.S. patent application Ser. No. 11/591,422, entitled "Method and System for Reallocating Blocks in a Storage Pool," filed on Oct. 31, 2006, in the names of the same inventors as the present application and assigned to a common assignee, the entire contents of which are incorporated herein by reference. In view of the above discussion, one skilled in the art will appreciate that the ability to add and/or remove disks from a storage pool without needing to recreate the storage pool allows for a wide range of options for managing the storage pool.

Figure 8:
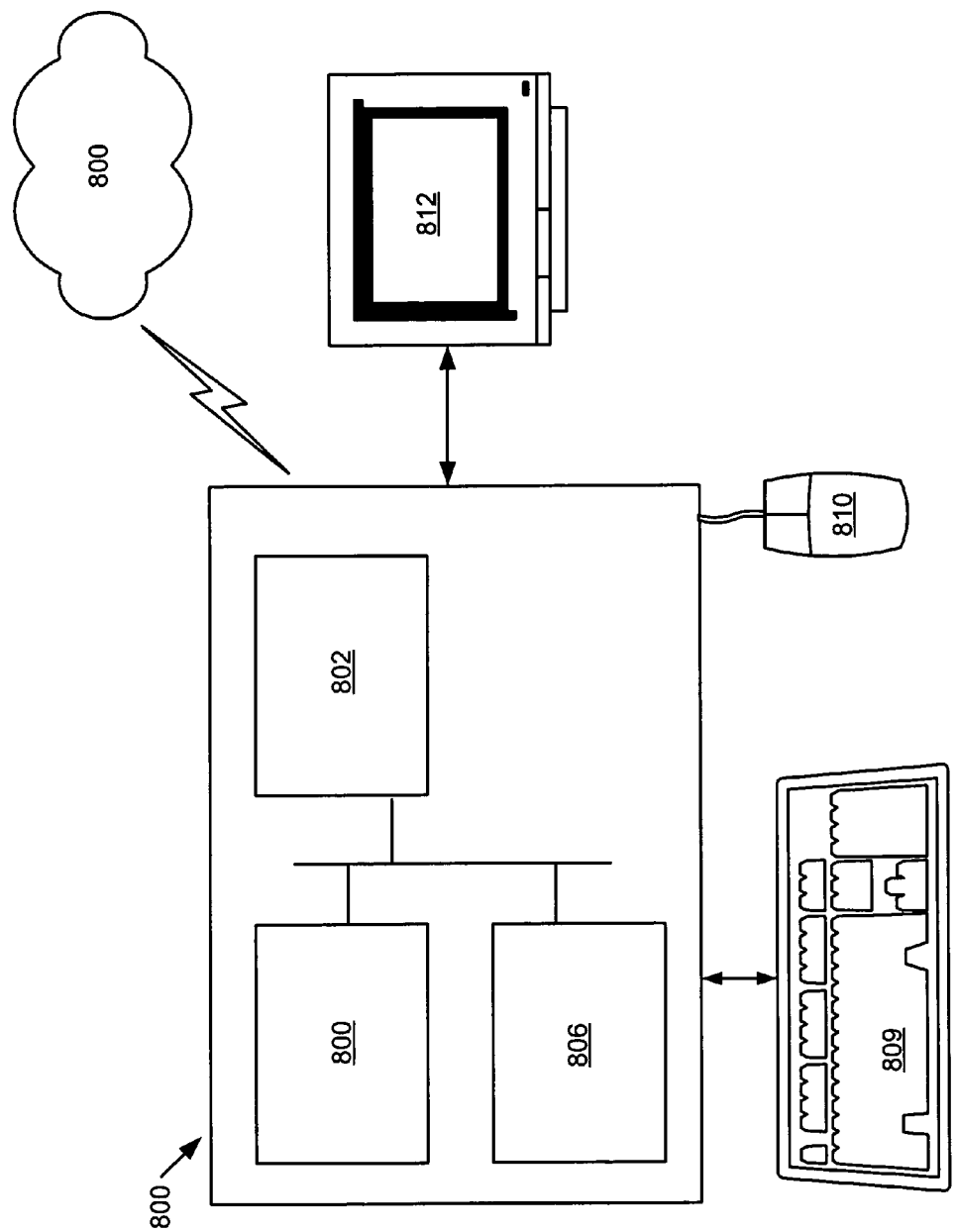
FIG. 8 shows a diagram of a computer system in accordance with one embodiment of the invention.

Embodiments of the invention may be implemented on virtually any type of computer regardless of the platform being used. For example, as shown in FIG. 8, a computer system (800) includes a processor (802), associated memory (804), a storage device (806), and numerous other elements and functionalities typical of today's computers (not shown). The computer (800) may also include input means, such as a keyboard (808) and a mouse (810), and output means, such as a monitor (812). The computer system (800) may be connected to a network (814) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (800) may be located at a remote location and connected to the other elements over a network. Further, embodiments of the invention may be implemented on a distributed system having a plurality of nodes, where each portion of the invention (e.g., operating system, file system, storage pool, disk, system call interface, data management unit, storage pool allocator, metaslab allocator, I/O management module, compression module, encryption module, checksum module, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for power-managing storage devices in a storage pool, comprising:

monitoring, by a management mechanism comprising at least a processor, after initialization, the storage pool to determine whether a storage management policy is satisfied, wherein the storage pool, after initialization, comprises a plurality of powered up storage devices that are each powered up and a powered down storage device that is powered down, wherein no data is read from the powered down storage device while the powered down storage device is powered down, and wherein no data is written to the powered down storage device while the powered down storage device is powered down, wherein the powered down storage device is powered up during initialization of the storage pool and powered down after initialization of the storage pool, and wherein monitoring the storage pool comprises:

aggregating a storage utilization level across the plurality of powered up storage devices to identify an aggregate storage utilization level of the plurality of powered up storage devices, wherein the aggregate storage utilization level identifies an amount of storage capacity used in the storage pool, and determining whether the aggregate storage utilization level reaches a threshold value specified by the storage management policy;

writing, while monitoring the storage pool and prior to powering up the powered down storage device, a first data block to a first powered up storage device of the plurality of powered up storage devices;

powering up the powered down storage device when the aggregate storage utilization level reaches the threshold value to add, as a second powered up storage device, the powered down storage device to the plurality of powered up storage devices;

making each of the plurality of powered up storage devices concurrently available for use after the second powered up storage device is added to the plurality of powered up storage devices;

writing, after making each of the plurality of powered up storage devices concurrently available for use, a first indirect block to the second powered up storage device, wherein the first indirect block comprises:
  a reference to a location corresponding to the first data block,
  a checksum for the first data block;
  a reference to a location corresponding to a second data block stored in one of the plurality of powered up storage devices, and
  a checksum for the second data block, receiving a request to write a second indirect block to the storage pool, wherein the second indirect block comprises:
  a reference to a location corresponding to the first indirect block, and
  a checksum for the first indirect block, selecting, for the request, the first powered up storage device based on a storage utilization level of each of the plurality of powered up storage devices; and writing, based on the selecting, the second indirect block to the first powered up storage device, wherein initializing the storage pool and powering down the powered down storage device are performed prior to powering up the powered down storage device.

2. The method of claim 1, further comprising:
striping data across the plurality of powered up storage devices after the second powered up storage device is added to the plurality of powered up storage devices.

3. The method of claim 1, wherein monitoring the storage pool, powering up the powered down storage device, and making each of the plurality of powered up storage devices available for use in the storage pool are managed by a file system associated with the storage pool.

4. The method of claim 1, wherein monitoring the storage pool, powering up the powered down storage device, and making the each of the plurality of powered up storage devices available for use in the storage pool are managed by an electronic storage management agent.

5. The method of claim 1, wherein the powered down storage device comprises a disk drive, and wherein powering up the powered down storage device comprises changing the disk drive from a spun down state to a spun up state.

6. The method of claim 1, wherein the threshold value is specified as at least one selected from a group consisting of a total amount of storage capacity used across all of the plurality of powered up storage devices and a percentage of storage capacity used across all of the plurality of powered up storage devices.

7. The method of claim 1, wherein the powered down storage device is a virtual device comprising a plurality of physical storage media.

8. The method of claim 1, wherein the powered down storage device comprises a storage medium selected from a group consisting of solid state storage, magnetic storage, and optical storage.

9. The method of claim 1, wherein the powered down storage device is selected from a plurality of powered down storage devices in the storage pool based on the storage management policy.

10. A system comprising:
a storage pool, after initialization, comprising:
  a plurality of powered up storage devices that are each powered up, and
  a powered down storage device that is powered down; and
a storage device management mechanism comprising at least a processor configured to:
  monitor, after the initialization, the storage pool to determine whether a storage management policy is satisfied,
  wherein the powered down storage device is powered up during initialization of the storage pool and powered down after initialization of the storage pool, wherein no data is read from the powered down storage device while the powered down storage device is powered down, and wherein no data is written to the powered down storage device while the powered down storage device is powered down, and
  wherein monitoring the storage pool comprises:
    aggregating a storage utilization level across the plurality of powered up storage devices to identify an aggregate storage utilization level of the plurality of powered up storage devices, wherein the aggregate storage utilization level identifies an amount of storage capacity used in the storage pool, and
    determining whether the aggregate storage utilization level reaches a threshold value specified by the storage management policy;
  write, while monitoring the storage pool and prior to powering up the powered down storage device, a first data block to a first powered up storage device of the plurality of powered up storage devices;
  power up the powered down storage device when the aggregate storage utilization level reaches the threshold value to add, as a second powered up storage device, the powered down storage device to the plurality of powered up storage devices;
  make each of the plurality of powered up storage devices concurrently available for use after the second powered up storage device is added to the plurality of powered up storage devices;
  write, after making each of the plurality of powered up storage devices concurrently available for use, a first indirect block to the second powered up storage device, wherein the first indirect block comprises:
    a reference to a location corresponding to the first data block,
    a checksum for the first data block,
    a reference to a location corresponding to a second data block stored in one of the plurality of powered up storage devices, and
    a checksum for the second data block,
  receive a request to write a second indirect block to the storage pool, wherein the second indirect block comprises:
    a reference to a location corresponding to the first indirect block, and
    a checksum for the first indirect block,
  select, for the request, the first powered up storage device based on a storage utilization level of each of the plurality of powered up storage devices; and
  write, based on the selecting, the second indirect block to the first powered up storage device,
  wherein initializing the storage pool and powering down the powered down storage device are performed prior to powering up the powered down storage device.

11. The system of claim 10, wherein data is striped across the plurality of powered up storage devices after the second powered up storage device is added to the plurality of powered up storage devices.

12. The system of claim 10, wherein the storage device management mechanism is a file system associated with the storage pool.

13. The system of claim 10, wherein the storage device management mechanism is an electronic storage management agent.

14. The system of claim 10, wherein the powered down storage device comprises a disk drive, and wherein powering up the powered down storage device comprises changing the disk drive from a spun down state to a spun up state.

15. The system of claim 10, wherein the threshold value is specified as at least one selected from a group consisting of a total amount of storage capacity used across all of the plurality of powered up storage devices and a percentage of storage capacity used across all of the plurality of powered up storage devices.

16. The system of claim 10, wherein the powered down storage device is a virtual device comprising a plurality of physical storage media.

17. The system of claim 10, wherein the powered down storage device comprises a storage medium selected from a group consisting of solid state storage, magnetic storage, and optical storage.

18. A non-transitory computer readable storage medium comprising executable instructions for power-managing storage devices in a storage pool by:
   monitoring, after initialization, the storage pool to determine whether a storage management policy is satisfied, wherein the storage pool, after initialization, comprises a plurality of powered up storage devices that are each powered up and a powered down storage device that is powered down, wherein no data is read from the powered down storage device while the powered down storage device is powered down, and wherein no data is written to the powered down storage device while the powered down storage device is powered down,
   wherein, during initialization of the storage pool, the plurality of powered up storage devices are powered up and the powered down storage device is powered up,
   wherein the powered down storage device is powered down after initialization of the storage pool, and
   wherein monitoring the storage pool comprises:
      aggregating a storage utilization level across the plurality of powered up storage devices to identify an aggregate storage utilization level of the plurality of powered up storage devices, wherein the aggregate storage utilization level identifies an amount of storage capacity used in the storage pool, and
      determining whether the aggregate storage utilization level reaches a threshold value specified by the storage management policy;
   writing, while monitoring the storage pool and prior to powering up the powered down storage device, a first data block to a first powered up storage device of the plurality of powered up storage devices;
   powering up the powered down storage device when the aggregate storage utilization level reaches the threshold value to add, as a second powered up storage device, the powered down storage device to the plurality of powered up storage devices;
   making each of the plurality of powered up storage devices concurrently available for use after the second powered up storage device is added to the plurality of powered up storage devices;
   writing, after making each of the plurality of powered up storage devices concurrently available for use, a first indirect block to the second powered up storage device, wherein the first indirect block comprises:
      a reference to a location corresponding to the first data block,
      a checksum for the first data block;
      a reference to a location corresponding to a second data block stored in one of the plurality of powered up storage devices, and
      a checksum for the second data block,
   receiving a request to write a second indirect block to the storage pool, wherein the second indirect block comprises:
      a reference to a location corresponding to the first indirect block, and
      a checksum for the first indirect block,
   selecting, for the request, the first powered up storage device based on a storage utilization level of each of the plurality of powered up storage devices; and
   writing, based on the selecting, the second indirect block to the first powered up storage device,
   wherein initializing the storage pool and powering down the powered down storage device are performed prior to powering up the powered down storage device.

19. The method of claim 1, further comprising:
   initializing the storage pool by configuring the storage pool to recognize a specific plurality of storage devices comprising the plurality of powered up storage devices and the powered down storage device.

20. The method of claim 19, wherein the specific plurality of storage devices are different types.

* * * * *